United States Patent
Sun et al.

(10) Patent No.: US 11,956,206 B2
(45) Date of Patent: Apr. 9, 2024

(54) COMMUNICATING WITH TWO OR MORE SLAVES

(71) Applicant: Micro Motion, Inc., Boulder, CO (US)

(72) Inventors: Li Sun, Shanghai (CN); Jingxian Song, Nanjing (CN)

(73) Assignee: Micro Motion, Inc., Boulder, CO (US)

(*) Notice: Subject to any disclaimer, the term of this patent is extended or adjusted under 35 U.S.C. 154(b) by 248 days.

(21) Appl. No.: 16/072,768

(22) PCT Filed: Feb. 26, 2016

(86) PCT No.: PCT/CN2016/074627
§ 371 (c)(1),
(2) Date: Jul. 25, 2018

(87) PCT Pub. No.: WO2017/143578
PCT Pub. Date: Aug. 31, 2017

(65) Prior Publication Data
US 2019/0036874 A1 Jan. 31, 2019

(51) Int. Cl.
*G06F 15/16* (2006.01)
*G06F 13/42* (2006.01)
(Continued)

(52) U.S. Cl.
CPC .......... *H04L 61/50* (2022.05); *G06F 13/4282* (2013.01); *H04L 12/40019* (2013.01);
(Continued)

(58) Field of Classification Search
CPC ............ H04L 61/20; H04L 12/40019; H04L 12/40123; H04L 12/403; G06F 13/4282; G06F 2213/0052
(Continued)

(56) References Cited

U.S. PATENT DOCUMENTS 5,544,332 A * 8/1996 Chen ............. G06F 13/362 710/108
5,661,232 A 8/1997 Van Cleve et al.
(Continued)

FOREIGN PATENT DOCUMENTS

CN 103853135 A 6/2014
EP 1701271 A1 9/2006
(Continued)

OTHER PUBLICATIONS

Philips Semiconductors: "The I2C bus specification, version 2.1", Internet Citation, 2000, pp. 1-46, XP002678058, Retrieved from the Internet: URL:http://i2c2p.twibright.com:8080/spec/i2c.pdf [retrieved on Jun. 19, 2012].
(Continued)

*Primary Examiner* — Yves Dalencourt
(74) *Attorney, Agent, or Firm* — The Ollila Law Group LLC (57) ABSTRACT

A method of communicating with two or more slaves is provided. The method includes receiving a command packet with an interface, wherein the command packet is sent by a master over a master-slave bus and associating a slave address of the command packet with one of two or more slaves communicatively coupled to the interface.

10 Claims, 8 Drawing Sheets

(51) Int. Cl.
*H04L 12/40* (2006.01)
*H04L 12/403* (2006.01)
*H04L 61/50* (2022.01)

(52) U.S. Cl.
CPC ...... *H04L 12/40123* (2013.01); *H04L 12/403* (2013.01); *G06F 2213/0052* (2013.01)

(58) Field of Classification Search
USPC ........................................................ 709/245
See application file for complete search history.

(56) References Cited

U.S. PATENT DOCUMENTS

| | | |
|---|---|---|
| 2004/0037303 A1 | 2/2004 | Joshi et al. |
| 2005/0046740 A1 | 3/2005 | Davis |
| 2005/0239503 A1 | 10/2005 | Dressen et al. |
| 2005/0273536 A1 | 12/2005 | Mathewson et al. |
| 2007/0143511 A1 | 6/2007 | Daly, Jr. et al. |
| 2008/0084886 A1* | 4/2008 | Cooley ............... G06F 13/4291 370/395.5 |
| 2008/0183928 A1 | 7/2008 | Devila et al. |
| 2009/0180483 A1 | 7/2009 | Przybylski |
| 2010/0250807 A1 | 9/2010 | Miyoshi |
| 2012/0331184 A1* | 12/2012 | Adar ....................... G06F 13/28 710/22 |
| 2014/0164659 A1* | 6/2014 | Quddus ............... G06F 13/4022 710/110 |
| 2014/0304412 A1* | 10/2014 | Prakash .............. H04L 61/1511 709/226 |
| 2015/0120975 A1 | 4/2015 | Sengoku |
| 2015/0301968 A1 | 10/2015 | Kessler |
| 2016/0226606 A1* | 8/2016 | Kwon .................. H04W 76/25 |

FOREIGN PATENT DOCUMENTS

| | | |
|---|---|---|
| JP | H02127752 A | 5/1990 |
| JP | 2009105731 A | 5/2009 |
| JP | 2013037477 A | 2/2013 |
| WO | 2008013545 A1 | 1/2008 |
| WO | 2008024112 A1 | 2/2008 |
| WO | 2008111983 A1 | 9/2008 |
| WO | 2009017494 A1 | 2/2009 |
| WO | 2009105096 A1 | 8/2009 |
| WO | 2009148451 A1 | 12/2009 |
| WO | 2010056244 A1 | 5/2010 |
| WO | 2012080556 A1 | 6/2012 |
| WO | 2015104535 A1 | 7/2015 |

OTHER PUBLICATIONS

Patel Mahendra: "I 2 C over DS90UB913/4 FPD-Link III with Bidirectional Control Channel", Application Report SNLA222, May 31, 2013, XP055160568, Retrieved from the Internet: URL:http://www.ti.com/lit/an/snla222/snla222.pdf [retrieved on Jan. 8, 2015].

* cited by examiner

COMMUNICATING WITH TWO OR MORE SLAVES

TECHNICAL FIELD

The embodiments described below relate to vibratory sensors and, more particularly, to communicating with two or more slaves.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized drive mechanism position, while the phase at the outlet leads the phase at the centralized drive mechanism position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the drive mechanism generates a drive signal to operate the drive mechanism and also to determine a mass flow rate and/or other properties of a process material from signals received from the pickoffs. The drive mechanism may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the drive mechanism arrangement.

Many systems utilize two or more meter assemblies due to various design constraints. For example, meter assemblies used in dispensing liquid natural gas (LNG) to LNG vehicles may utilize a first meter assembly to measure fuel pumped from an LNG storage tank to the LNG vehicle. A second meter assembly may be used to measure the fuel that is returned to the LNG tank. The fuel returned to the LNG tank may have a different flow rate, temperature, state, etc. A host may obtain the information from the first and second meter assembly over a master-slave bus, where the host is a master and the first and second meter assembly are slaves. Accordingly, there is a need to communicate with two or more slaves.

SUMMARY

A method of communicating with two or more slaves is provided. According to an embodiment, the method comprises receiving a command packet with an interface, wherein the command packet is sent by a master over a master-slave bus, and associating a slave address of the command packet with one of two or more slaves communicatively coupled to the interface.

An interface for communicating with two or more slaves is provided. According to an embodiment, the interface comprises a processor configured to communicatively couple to two or more slaves and a communication port communicatively coupled to the processor. The communication port is configured to communicatively couple to a master-slave bus. The processor is configured to receive a command packet from a master over the master-slave bus and associate a slave address of the command packet with one of the two or more slaves.

A system for communicating with two or more slaves is provided. According to an embodiment, the system comprises an interface communicatively coupled to a master over a master-slave bus and two or more slaves communicatively coupled to the interface. The interface is configured to receive a command packet from the master over the master-slave bus and associate a slave address of the command packet with one of the two or more slaves.

ASPECTS

According to an aspect, a method of communicating with two or more slaves comprises receiving a command packet with an interface, wherein the command packet is sent by a master over a master-slave bus, and associating a slave address of the command packet with one of two or more slaves communicatively coupled to the interface.

Preferably, receiving the command packet with the interface comprises receiving the command packet with a port communicatively coupled to the master-slave bus and determining if the slave address corresponds to at least one of the two or more slaves.

Preferably, associating the slave address with the one of the two or more slaves communicatively coupled to the interface comprises associating the slave address with one of two or more arrays, wherein each of the two or more arrays is associated with each of the two or more slaves.

Preferably, associating the slave address with the one of the two or more slaves communicatively coupled to the interface comprises parsing the slave address from the command packet and comparing the parsed slave address with two or more address groups, wherein each of the two or of more address groups is associated with each of the two or more slaves.

Preferably, the method further comprises responding to the command packet by transmitting a response packet with data obtained from the one of the two or more slaves that is associated with the slave address in the command packet.

Preferably, the response packet is transmitted over the port communicatively coupled to the master-slave bus.

According to an aspect, an interface (100) for communicating with two or more slaves comprises a processor (110) configured to communicatively couple to two or more slaves (10a, 10b) and a communication port (140) communicatively coupled to the processor (110), the communication port (140) being configured to communicatively couple to a master-slave bus (50). The processor (110) is configured to receive a command packet (500a, 500b) from a master (40) over the master-slave bus (50) and associate a slave address (502a, 502b) of the command packet (500a, 500b) with one of the two or more slaves (10a, 10b).

Preferably, the processor (110) being configured to receive the command packet (500a, 500b) comprises the processor (110) being configured to receive the command packet (500a, 500b) with a communication port (140) communicatively coupled to the master-slave bus (50) and determine if the slave address (502a, 502b) corresponds to at least one of the two or more slaves (10a, 10b).

Preferably, the processor (110) being configured to associate the slave address (502a, 502b) with the one of the two or more slaves (10a, 10b) communicatively coupled to the interface (100) comprises the processor (110) being configured to associate the slave address (502a, 502b) with one of two or more arrays (104a, 104b), wherein each of the two or more arrays (104a, 104b) is associated with each of the two or more slaves (10a, 10b).

Preferably, the processor (110) being configured to associate the slave address (502a, 502b) with the one of the two or more slaves (10a, 10b) communicatively coupled to the interface (100) comprises the processor (110) being configured to parse the slave address (502a, 502b) from the command packet (500a, 500b) and compare the parsed slave address (502a, 502b) with two or more address groups (102a, 102b), wherein each of the two or of more address groups (102a, 102b) is associated with each of the two or more slaves (10a, 10b).

Preferably, the processor (110) is further configured to respond to the command packet (500a, 500b) by transmitting a response packet with data obtained from the one of the two or more slaves (10a, 10b) that is associated with the slave address (502a, 502b) in the command packet (500a, 500b).

Preferably, the response packet is transmitted over the communication port (140) communicatively coupled to the master-slave bus (50).

According to an aspect, a system (5) for communicating with two or more slaves comprises an interface (100) communicatively coupled to a master (40) over a master-slave bus (50) and two or more slaves (10a, 10b) communicatively coupled to the interface (100). The interface (100) is configured to receive a command packet (500a, 500b) from the master (40) over the master-slave bus (50) and associate a slave address (502a, 502b) of the command packet (500a, 500b) with one of the two or more slaves (10a, 10b).

Preferably, the interface (100) being configured to receive the command packet (500a, 500b) comprises the interface (100) being configured to receive the command packet (500a, 500b) with a communication port (140) communicatively coupled to the master-slave bus (50) and determine if the slave address (502a, 502b) corresponds to at least one of the two or more slaves (10a, 10b).

Preferably, the interface (100) being configured to associate the slave address (502a, 502b) with the one of the two or more slaves (10a, 10b) communicatively coupled to the interface (100) comprises the interface (100) being configured to associate the slave address (502a, 502b) with an array of two or more arrays (104a, 104b), wherein each of the two or more arrays (104a, 104b) is associated with each of the two or more slaves (10a, 10b).

Preferably, the interface (100) being configured to associate the slave address (502a, 502b) with the one of the two or more slaves (10a, 10b) communicatively coupled to the interface (100) comprises the interface (100) being configured to parse the slave address (502a, 502b) from the command packet (500a, 500b) and compare the parsed slave address (502a, 502b) with two or more address groups (102a, 102b), wherein each of the two or of more address groups (102a, 102b) is associated with each of the two or more slaves (10a, 10b).

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of embodiments of communicating with two or more slaves. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of communicating with two or more slaves. As a result, the embodiments described below are not limited to the specific examples described below, but only by the claims and their equivalents.

An interface may communicate with two or more slaves. The interface may be comprised of a processor communicatively coupled to the two or more slaves and a communication port that is configured to communicatively couple to a master-slave bus. The processor may be configured to receive a command packet from a master over the master-slave bus and associate a slave address of the command packet with one of the two or more slaves. Accordingly, the master can communicate with each of the two or more slave addresses through a single interface.

System

Figure 1:
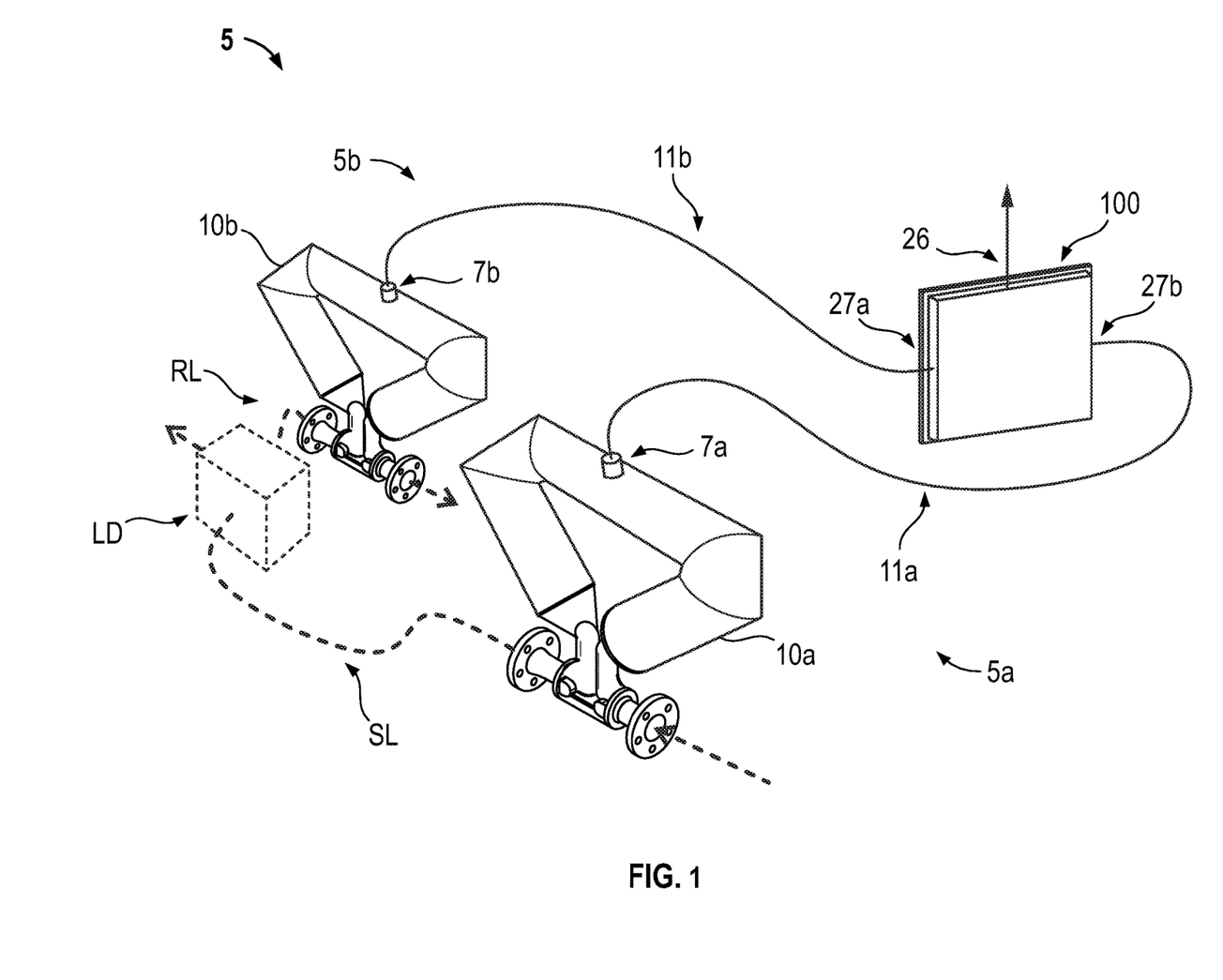
FIG. 1 shows a system 5 that includes an interface 100 for communicating with two or more slaves.

FIG. 1 shows a system 5 that includes an interface 100 for communicating with two or more slaves. The system 5 may be a dual vibratory sensor system. Accordingly, as shown in FIG. 1, the system 5 includes a first and second subsystem 5a, 5b, which may respectively be a first and second vibratory sensor, such as a Coriolis flow meter. The first and second subsystem 5a, 5b are respectively comprised of the interface 100 and the first and second slave 10a, 10b. The interface 100 may be meter electronics and the first and second slave 10a, 10b may be meter assemblies configured to measure a property of a fluid in the meter assemblies, as the following explains.

The interface 100 is communicatively coupled to the first and second slave 10a, 10b via a first and second set of leads 11*a*, 11*b*. The first and second set of leads 11*a*, 11*b* are coupled (e.g., attached, affixed, etc.) to a first and second communication port 27*a*, 27*b* on the interface 100. The first and second set of leads 11*a*, 11*b* are also coupled to the first and second slave 10*a*, 10*b* via a first and second communication port 7*a*, 7*b* on the first and second slave 10*a*, 10*b*. The interface 100 is configured to provide information over path 26 to a master. The first and second slave 10*a*, 10*b* are shown with a case that surrounds flow tubes. The interface 100 and first and second slave 10*a*, 10*b* are described in more detail in the following with reference to FIGS. 2 and 3.

Still referring to FIG. 1, the first and second subsystem 5*a*, 5*b*, as vibratory sensors, can be used to, for example, calculate a difference in flow rate and/or total flow between a supply line SL and a return line RL. More specifically, the system 5 may be employed in a cryogenic application where fluid is supplied from a tank in liquid state and then returned to the tank in a gaseous state. In one exemplary cryogenic application, the first slave 10*a* may be part of the supply line SL that supplies LNG to an LNG dispenser LD and the second slave 10*b* may be part of a return line RL from the LNG dispenser LD. The total flow through the second slave 10*b* can be subtracted from the total flow through the first slave 10*a* to determine the total amount of LNG supplied to the LNG vehicle. This exemplary application with the supply and return line SL, RL is shown with dashed lines to illustrate that the system 5 can be employed in other applications. As can also be appreciated, in the described and other embodiments, the calculations can be performed by the interface 100, which is described in more detail in the following.

Figure 2:
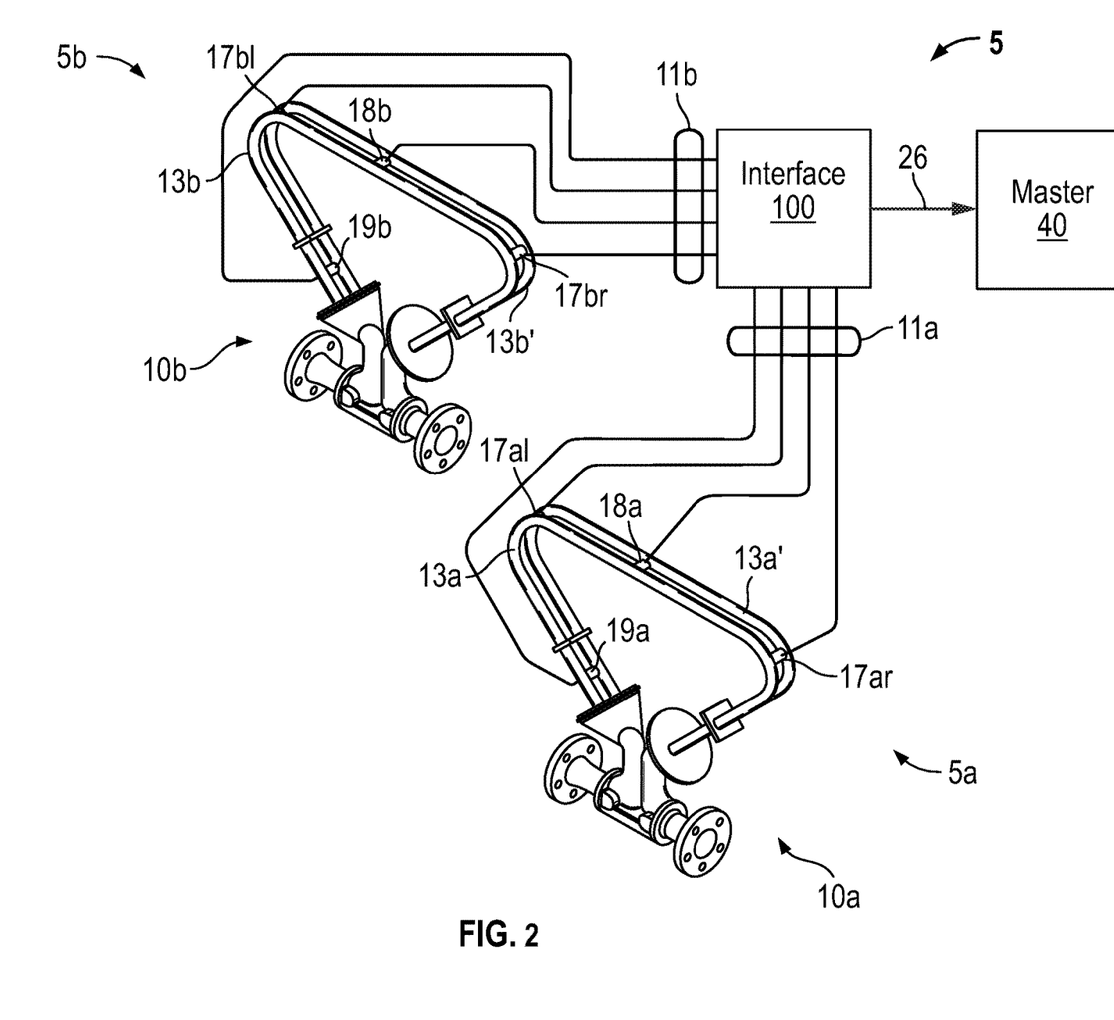
FIG. 2 shows the system 5 that includes the interface 100 for communicating with two or more slaves.

FIG. 2 shows the system 5 that includes the interface 100 for communicating with two or more slaves. As shown in FIG. 2, the system 5 includes the first and second sub-system 5*a*, 5*b* described in the foregoing with reference to FIG. 1. The cases on the interface 100 and first and second slave 10*a*, 10*b* are not shown for clarity. The interface 100 is connected to the first and second slave 10*a*, 10*b* via a first and second set of leads 11*a*, 11*b* to provide density, mass flow rate, and temperature information over the path 26, as well as other information. A Coriolis flow meter structure is shown although it is apparent to those skilled in the art that the present invention could be practiced with any systems, including actuators or transducers. Alternative vibrating structures may be employed, such as a vibrating conduit densitometer, tuning fork densitometer, or the like.

As shown, the first and second slave 10*a*, 10*b* are meter assemblies that include a first and second pair of parallel conduits 13*a*, 13*a*' and 13*b*, 13*b*', drive mechanism 18*a*, 18*b*, temperature sensor 19*a*, 19*b*, and pair of left and right pick-off sensors 17*al*, 17*ar* and 17*bl*, 17*br*. Each of the pair of conduits 13*a*, 13*a*' and 13*b*, 13*b*' bend at two symmetrical locations along the conduits 13*a*, 13*a*' and 13*b*, 13*b*' length and are essentially parallel throughout their length. The conduits 13*a*, 13*a*' and 13*b*, 13*b*' are driven by the drive mechanisms 18*a*, 18*b* in opposite directions about their respective bending axes and at what is termed the first out-of-phase bending mode of the flow meter. The drive mechanisms 18*a*, 18*b* may comprise any one of many arrangements, such as a magnet mounted to the conduits 13*a*', 13*b*' and an opposing coil mounted to the conduits 13*a*, 13*b* and through which an alternating current is passed for vibrating both conduits 13*a*, 13*a*' and 13*b*, 13*b*'. A suitable drive signal is applied by the interface 100 to the drive mechanisms 18*a*, 18*b*.

The first and second sub-system 5*a*, 5*b* can be initially calibrated and a flow calibration factor FCF, along with a zero offset $\Delta T_0$, can be generated. In use, the flow calibration factor FCF can be multiplied by the time delay $\Delta T$ measured by the pickoffs minus the zero offset $\Delta T_0$ to generate a mass flow rate $\dot{m}$. An example of a mass flow rate equation utilizing a flow calibration factor FCF and a zero offset $\Delta T_0$ is described by Equation (1):

$$\dot{m} = FCF(\Delta T_{measured} - \Delta T_0) \tag{1}$$

Where:
$\dot{m}$=mass flow rate
FCF=flow calibration factor
$\Delta T_{measured}$=measured time delay
$\Delta T_0$=initial zero offset The temperature sensors 19*a*, 19*b* are mounted to conduits 13*a*', 13*b*' to continuously measure the temperature of the conduits 13*a*', 13*b*'. The temperature of the conduits 13*a*', 13*b*' and hence the voltage appearing across the temperature sensors 19*a*, 19*b* for a given current is governed by the temperature of the material passing through the conduits 13*a*', 13*b*'. The temperature dependent voltages appearing across the temperature sensor 19*a*, 19*b* may be used by the interface 100 to compensate for the change in elastic modulus of the conduits 13*a*', 13*b*' due to any changes in conduit temperature. In the embodiment shown, the temperature sensors 19*a*, 19*b* are resistive temperature detectors (RTD). Although the embodiments described herein employ RTD sensors, other temperature sensors may be employed in alternative embodiments, such as thermistors, thermocouples, etc.

The interface 100 receives the left and right sensor signals from the first and second left and right pick-off sensors 17*al*, 17*ar* and 17*bl*, 17*br* and the temperature signals from the first and second temperature sensor 19*a*, 19*b* via the first and second set of leads 11*a*, 11*b*. The interface 100 provides a drive signal to the drive mechanisms 18*a*, 18*b* and vibrates the first and second pair of conduits 13*a*, 13*a*' and 13*b*, 13*b*'. The interface 100 processes the left and right sensor signals and the temperature signals to compute the mass flow rate and the density of the material passing through the first and/or second slave 10*a*, 10*b*. This information, along with other information, is applied by interface 100 over path 26 as a signal.

As can be appreciated, although the system 5 shown in FIGS. 1 and 2 includes only two slaves 10*a*, 10*b*, the system 5 may be employed in systems that include more than two slaves. For example, an interface may be configured to communicate with three or more slaves. In such a configuration, the system 5 may be a portion of the interface and two of the three or more slaves.

Interface

Figure 3:
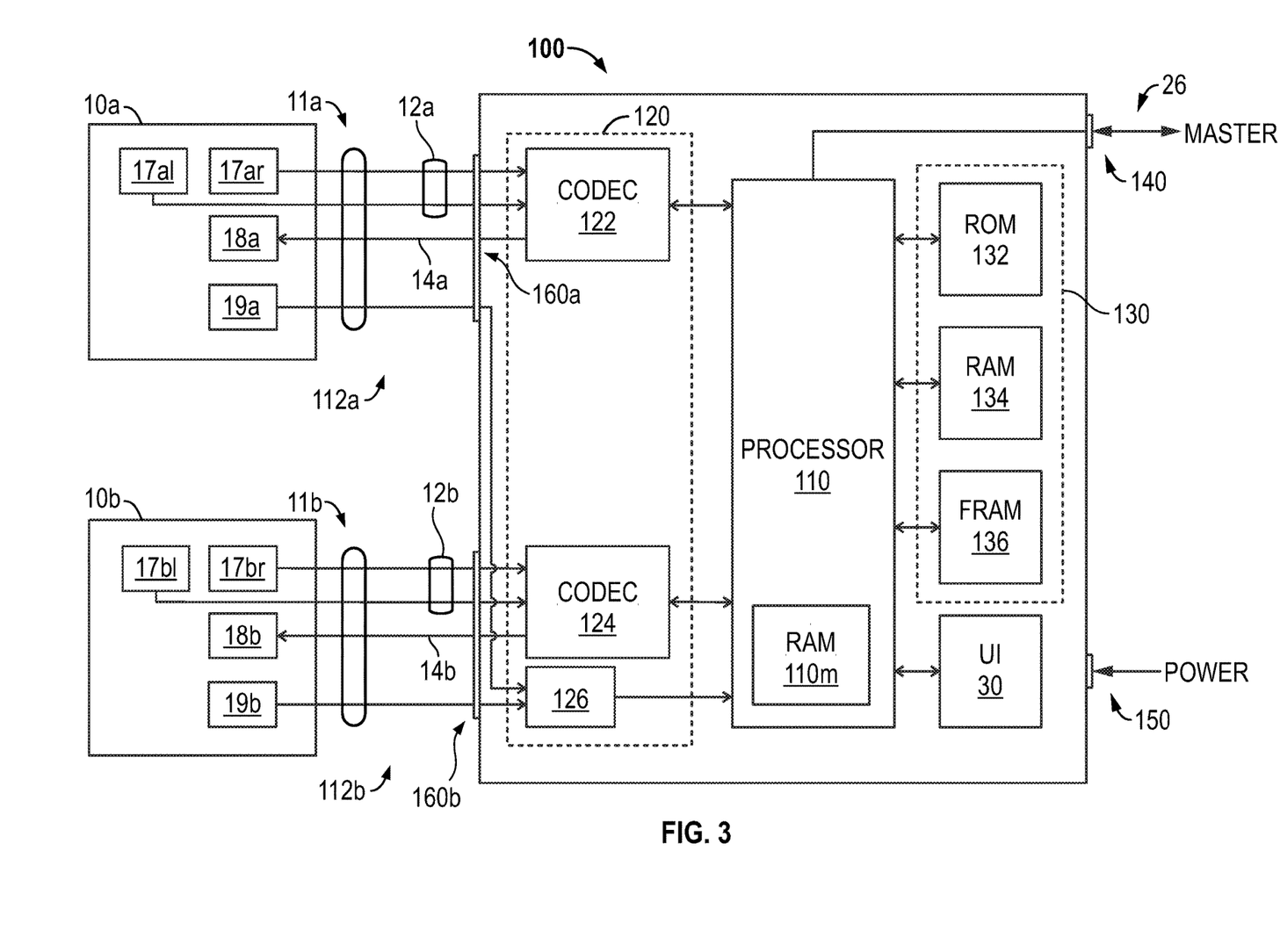
FIG. 3 shows a block diagram of the interface 100.

FIG. 3 shows a block diagram of the interface 100. As shown in FIG. 3, the interface 100 is communicatively coupled to the first and second slave 10*a*, 10*b*. As described in the foregoing with reference to FIG. 1, the first and second slave 10*a*, 10*b* include the first and second left and right pick-off sensors 17*al*, 17*ar* and 17*bl*, 17*br*, drive mechanism 18*a*, 18*b*, and temperature sensor 19*a*, 19*b*, which are communicatively coupled to the interface 100 via the first and second set of leads 11*a*, 11*b* through a first and second communication channel 112*a*, 112*b* and a first and second I/O port 160*a*, 160*b*.

The interface 100 provides a first and second drive signal 14*a*, 14*b* via the leads 11*a*, 11*b*. More specifically, the interface 100 provides a first drive signal 14a to the first drive mechanism 18a in the first slave 10a. The interface 100 is also configured to provide a second drive signal 14b to the second drive mechanism 18b in the second slave 10b. In addition, a first and second sensor signal 12a, 12b are respectively provided by the first and second slave 10a, 10b. More specifically, in the embodiment shown, the first sensor signal 12a is provided by the first left and right pick-off sensors 17al, 17ar in the first slave 10a. The second sensor signal 12b is provided by the second left and right pick-off sensor 17bl, 17br in the second slave 10b. As can be appreciated, the first and second sensor signal 12a, 12b are respectively provided to the interface 100 through the first and second communication channel 112a, 112b.

The interface 100 includes a processor 110 communicatively coupled to one or more signal processors 120 and one or more memories 130. The processor 110 is also communicatively coupled to a user interface 30. The processor 110 is communicatively coupled with the master via a communication port 140 over the path 26 and receives electrical power via an electrical power port 150. The processor 110 may be a microprocessor although any suitable processor may be employed. As shown, the processor 110 includes a processor memory 110m although any suitable configuration may be employed in alternative embodiments. For example, the processor 110 may be comprised of sub-processors, such as a multi-core processor, serial communication ports, peripheral interfaces (e.g., serial peripheral interface), on-chip memory, I/O ports, and/or the like. In these and other embodiments, the processor 110 is configured to perform operations on received and processed signals, such as digitized signals.

The processor 110 may receive digitized sensor signals from the one or more signal processors 120. The processor 110 is also configured to provide information, such as a phase difference, a property of a fluid in the first or second slave 10a, 10b, or the like. The processor 110 may provide the information to the master through the communication port 140. The processor 110 may also be configured to communicate with the one or more memories 130 to receive and/or store information in the one or more memories 130. For example, the processor 110 may receive calibration factors and/or meter assembly zeros (e.g., phase difference when there is zero flow) from the one or more memories 130. Each of the calibration factors and/or meter assembly zeros may respectively be associated with the first and second subsystem 5a, 5b and/or the first and second slave 10a, 10b. The processor 110 may use the calibration factors to process digitized sensor signals received from the one or more signal processors 120.

The one or more signal processors 120 is shown as being comprised of a first and second encoder/decoder (CODEC) 122, 124 and an analog-to-digital converter (ADC) 126. The one or more signal processors 120 may condition analog signals, digitize the conditioned analog signals, and/or provide the digitized signals. The first and second CODEC 122, 124 are configured to receive the left and right sensor signal from the first and second left and right pick-off sensors 17al, 17ar and 17bl, 17br. The first and second CODEC 122, 124 are also configured to provide the first and second drive signal 14a, 14b to the first and second drive mechanism 18a, 18b. In alternative embodiments, more or fewer signal processors may be employed. For example, a single CODEC may be employed for the first and second sensor signal 12a, 12b and first and second drive signal 14a, 14b.

In the embodiment shown, the one or more memories 130 is comprised of a read-only memory (ROM) 132, random access memory (RAM) 134, and ferroelectric random-access memory (FRAM) 136. However, in alternative embodiments, the one or more memories 130 may be comprised of more or fewer memories. Additionally or alternatively, the one or more memories 130 may be comprised of different types of memory (e.g., volatile, non-volatile, etc.). For example, a different type of non-volatile memory, such as, for example, erasable programmable read only memory (EPROM), or the like, may be employed instead of the FRAM 136.

Accordingly, the interface 100 may be configured to convert the first and second sensor signal 12a, 12b from analog signals to digital signals. The interface 100 may also be configured to process the digitized sensor signals to determine properties of the fluid in the first and second slave 10a, 10b. For example, in an embodiment, the interface 100 can respectively determine a first and second phase difference between the first and second left and right pick-off sensors 17al, 17ar and 17bl, 17br in the first and second slave 10a, 10b.

The data obtained from the first and second slave 10a, 10b may be provided to the master 40 over the master-slave bus 50 through the interface 100. Accordingly, the master 40 can communicate with each of the first and second slave 10a, 10b even though a single interface 100 is used, as the following discusses in more detail.

Figure 4:
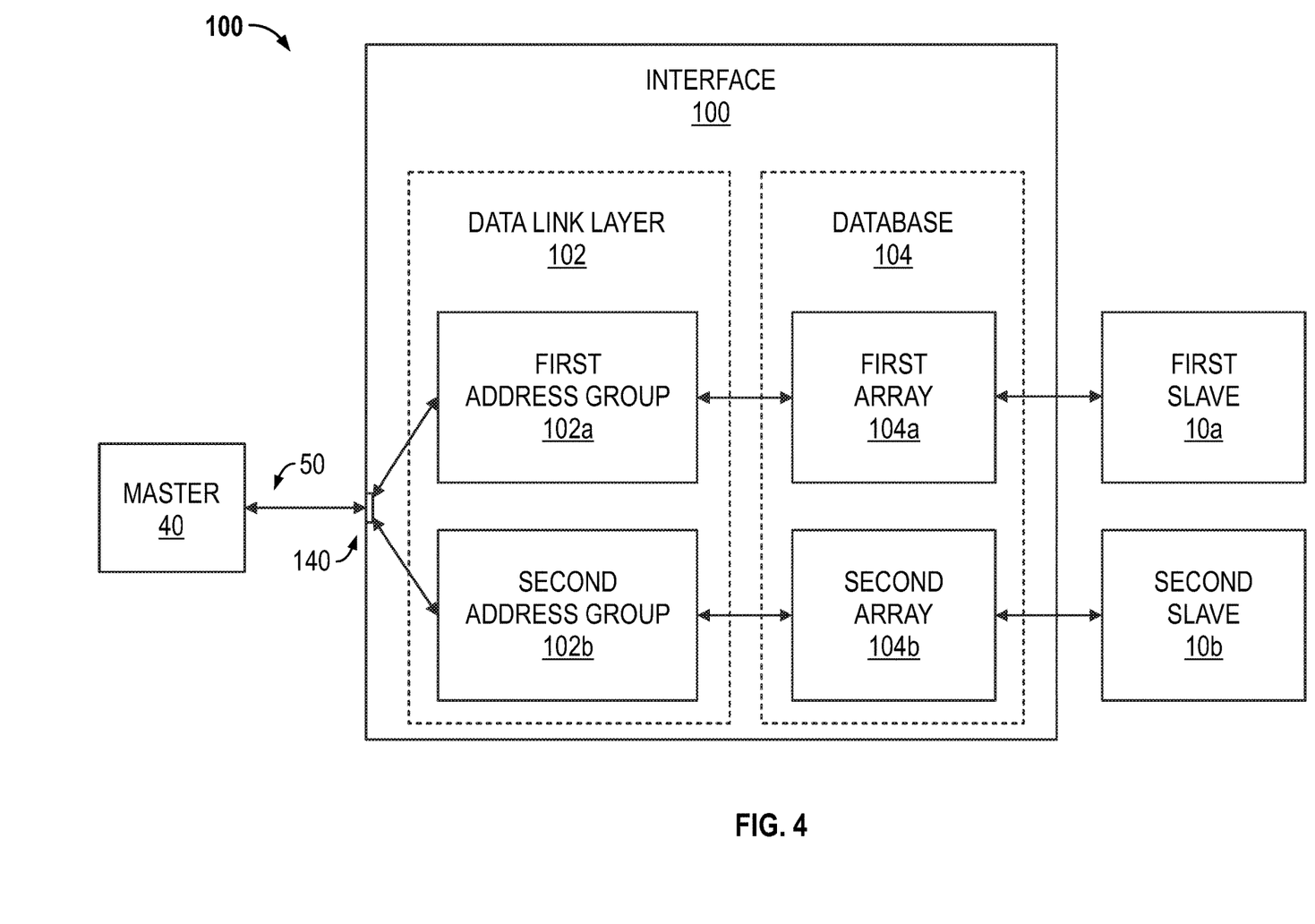
FIG. 4 shows another view of the interface 100 for communicating with two or more slaves.

FIG. 4 shows another view of the interface 100 for communicating with two or more slaves. As shown in FIG. 4, the interface 100 is communicatively coupled to the master 40 over a master-slave bus 50, which may include the path 26 described in the foregoing with reference to FIGS. 1-3. As shown in FIG. 4, the interface 100 includes a data link layer 102 and a database 104, which may respectively include two or more address groups and arrays. Also shown are the first and second slave 10a, 10b. The data link layer 102 includes a first address group 102a and a second address group 102b. The database 104 includes a first array 104a and a second array 104b. The first and second address group 102a, 102b are respectively communicatively coupled to the first and second array 104a, 104b.

The data link layer 102 may be a serial communication protocol for communication between a master and a slave. In server-client terminology, the master may alternatively be referred to as a client and the slave may be referred to as a server. In the embodiment shown, the master 40 transmits a command/request to the first or second slave 10a, 10b over the master-slave bus 50 using the data link layer 102. The data link layer 102 may determine if a slave address in the command/request matches the one of the first and second address group 102a, 102b. If the slave address matches one of the first and second address group 102a, 102b, then the command/request may be communicatively coupled with the corresponding first or second array 104a, 104b, which is described in more detail in the following with reference to FIG. 5.

Master-Slave Bus

Still referring to the embodiment shown in FIG. 4, the master 40 initiates all communications over the master-slave bus 50. That is, slaves on the master-slave bus do not initiate communication with, for example, an interrupt request. Communication is initiated when the master sends a command packet to a slave on the master-slave bus. To send the command to the correct slave, the command packet includes an address field with an address of the slave intended to receive the command packet. The addressed slave receives the command/request packet and responds by transmitting a response packet over the master-slave bus. The response may or may not have an address of the master.

As shown in FIG. 4, the command-response protocol utilizes a serial communication standard, such as RS-232 or RS-485. Accordingly, the interface 100 may be configured to communicate using the RS-232 or RS-485 standard. More specifically, the communication port 140 may be a connector that is compatible with the RS-232 or RS-485 standard. However, in alternative embodiments, the command-response protocol may be 'bundled' within other protocols. For example, the command-response protocol may be included within an Ethernet communication. Accordingly, the communication port 140 may be an Ethernet port. Alternative ports and protocols may be used in other embodiments.

In these and other embodiments, the first and second array 104a, 104b can respond to the command/request packet with, for example, data that is stored in the first and second array 104a, 104b. For example, if the slave address in the command/request packet corresponds to the first slave 10a, then the first array 104a may respond with data provided by the first slave 10a. Similarly, if the slave address corresponds to the second slave 10b, then the second array 104b may respond with data provided by the second slave 10b. The provided data may be data already stored in the first and second array 104a, 104b, provided by the first and second slave 10a, 10b in response to the command/request packet, or the like.

The data provided by the first and second array 104a, 104b may be transmitted to the master 40 in a response packet using the first and second address group 102a, 102b. As shown in FIG. 4, the data provided by the first array 104a may be associated with the slave address in the command/request packet. The response packet may be transmitted to via the data link layer 102 to the master 40. The transmission may occur through the communication port 140 and over the master-slave bus 50. However, in alternative embodiments, the transmission may occur over an alternative communication port and/or bus.

The foregoing discusses the use of the command-response protocol. As discussed in the foregoing, the command-response protocol utilizes command and response packets to communicate with the two or more slaves 10a, 10b. The command and response packets are discussed in more detail in the following with reference to FIG. 5.

Packets

Figure 5:
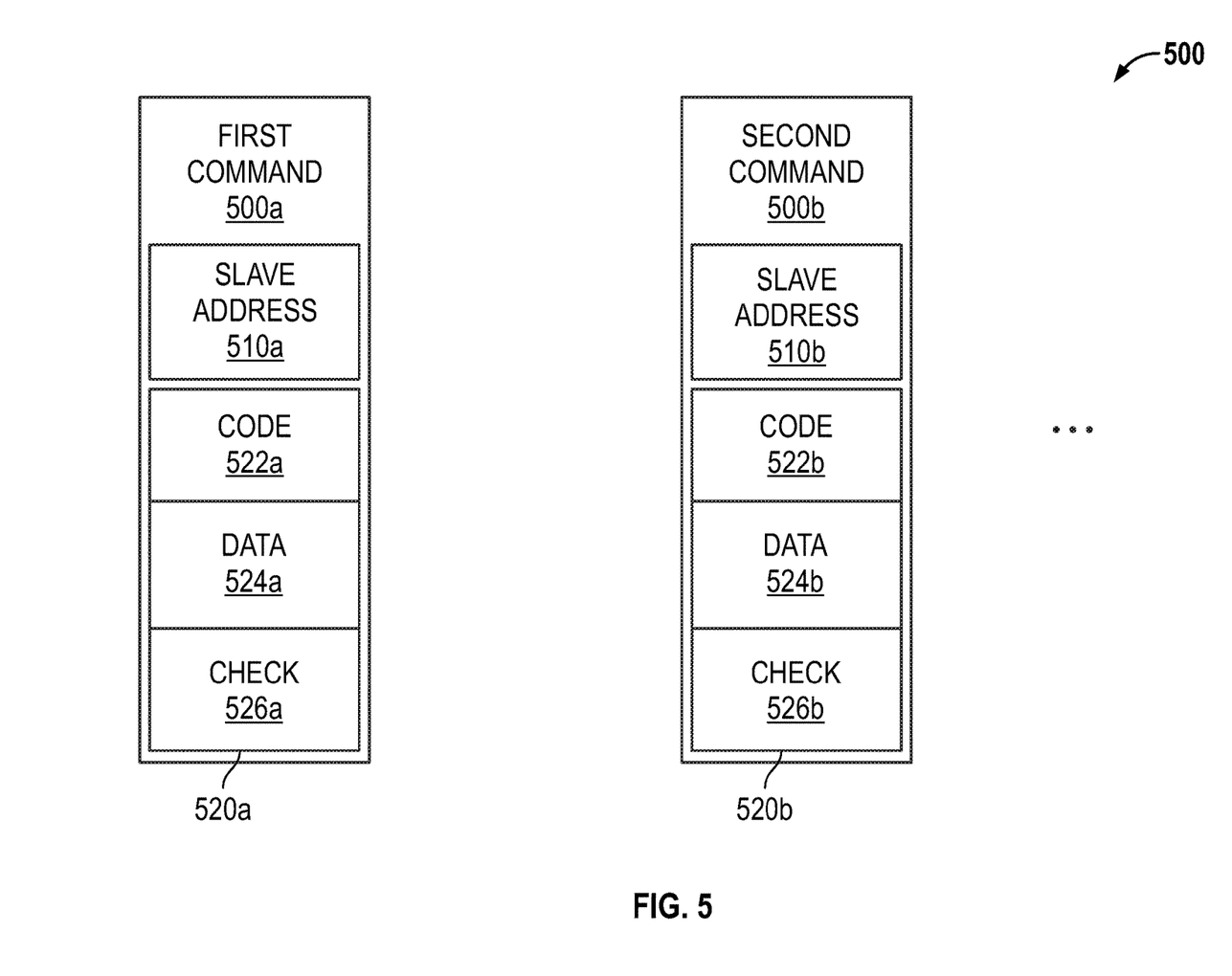
FIG. 5 shows two or more command packets 500 used to communicate with two or more slaves.

FIG. 5 shows two or more command packets 500 used to communicate with two or more slaves. As shown in FIG. 5, the two or more command packets 500 include a first command packet 500a and a second command packet 500b. The first and second command packet 500a, 500b respectively include a first and second slave address 510a, 510b and payload 520a, 520b. In the embodiment shown in FIG. 5, the first and second payload 520a, 520b respectively include a first and second code 522a, 522b, data 524a, 524b, and check 526a, 526b, which may be used to check the integrity of the first and second command packet 500a, 500b.

The first and second command packet 500a, 500b may be structured with headers and a protocol data unit (PDU). As shown in FIG. 4, the PDU is comprised of the first and second code 522a, 522b and data 524a, 524b. The headers are used to convey the PDU over the bus to the addressed device (e.g., master 40, first or second slave 10a, 10b, etc.).

In the embodiment shown, the first and second slave address 510a, 510b may be comprised of an integer value that can range from 1 to 247. Accordingly, there may be 248 unique devices coupled to the master-slave bus 50. Other addresses may be used. For example, '0' may be used for a broadcast message that is received by all of the slaves.

In the PDU, the first and second code 522a, 522b may be used to instruct the slave to write or read from a database. For example, the first and second code 522a, 522b may instruct a slave to access, read, and/or write information in a particular table, array, or other data structure, in the database. The data written to the data structure may be the first and second data 524a, 524b. The first and second data 524a, 524b may be any appropriate data that is, for example, suitable for use by the slave. For example, first and second data 524a, 524b may also contain executable commands that can cause the slave to, for example, provide data, perform functions, such as actuating or obtaining measurements, etc. The data can also include non-executable data. For example, in the embodiment where the first and second slave 10a, 10b are meter assemblies, the first and second payload 520a, 520b may include information such as a type of data requested. The type of data requested may be a flow rate respectively measured by the first and second slave 10a, 10b.

In the command-response protocol, the response packet may have a structure similar to the command packet. For example, the response packet may have a header that includes an address. The address may be the address of the slave that is providing the response packet. Additionally or alternatively, the header may include the address of the master. The PDU in the response packet may include data provided by the slave. Processes that execute the command-response protocol are described in more detail in the following with reference to FIG. 6.

Packet Processes

Figure 6:
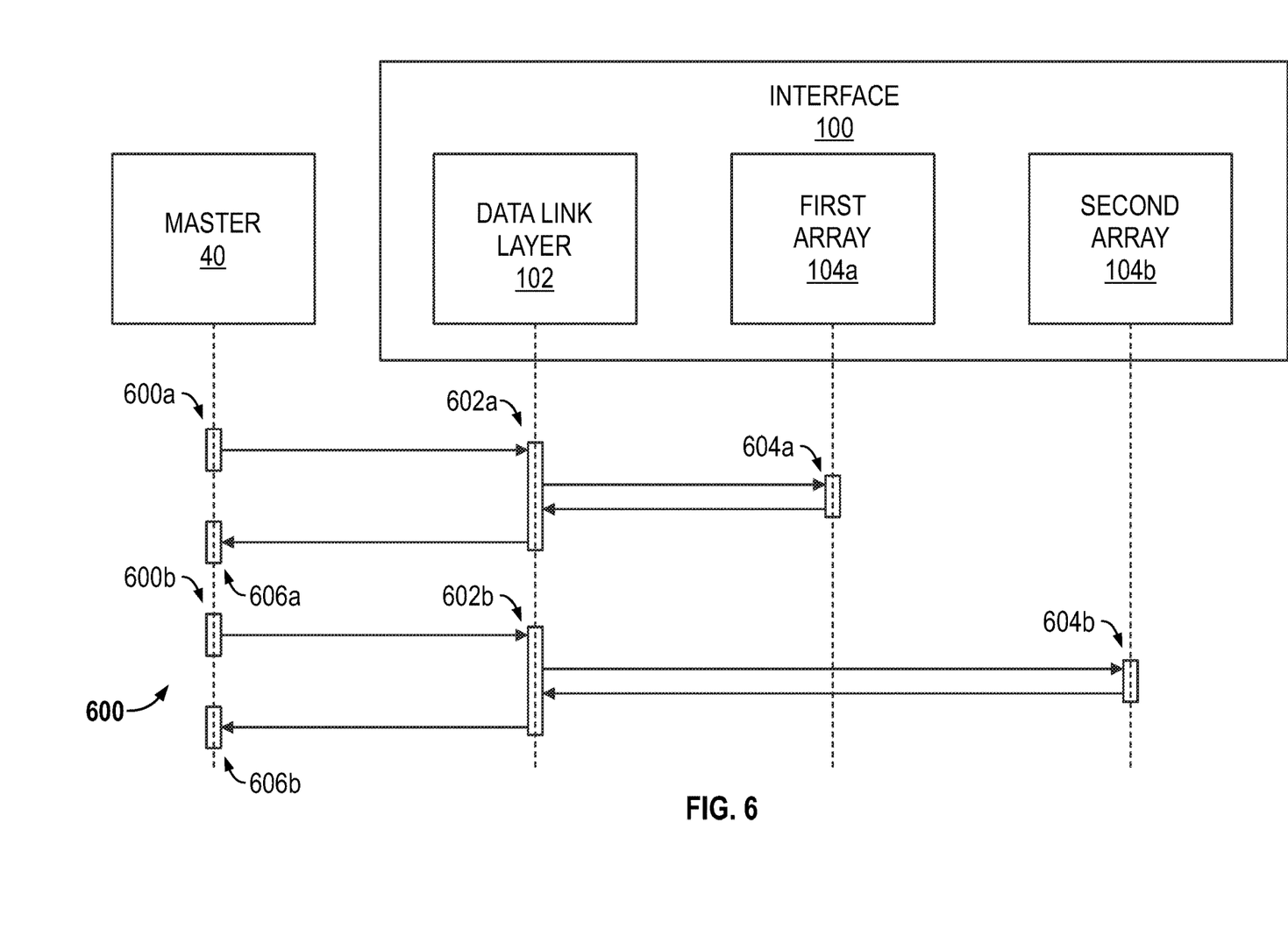
FIG. 6 shows two or more packet processes 600 used to communicate with two or more slaves.

FIG. 6 shows two or more packet processes 600 used to communicate with two or more slaves. The interface 100 described in the foregoing with reference to FIG. 5 is also shown with the data link layer 102 and first and second array 104a, 104b. As shown in FIG. 6, the two or more packet processes 600 includes a first and second packet process 600a, 600b. In the embodiment shown, the first and second packet process 600a, 600b may respectively receive the first and second command packet 500a, 500b, which is described in the foregoing with reference to FIG. 5, although other packets may be employed in alternative embodiments.

As shown in FIG. 6, the first and second packet process 600a, 600b respectively include a first and second parser 602a, 602b, which is performed at the data link layer 102, and payload processors 604a, 604b. The first and second payload processors 604a, 604b respectively receive and interpret the first and second payload 520a, 520b as a request for data from the first and second array 104a, 104b, and returns the requested data to the first and second parser 602a, 602b. The first and second parser 602a, 602b bundles the requested data into a first and second response packet and sends the first and second response packet as a first and second response 606a, 606b.

The interface 100, command-response protocol, and packet processes 600, as well as other embodiments, may be used by methods to communicate with two or more slaves, as the following discusses in more detail.

Methods

Figure 7:
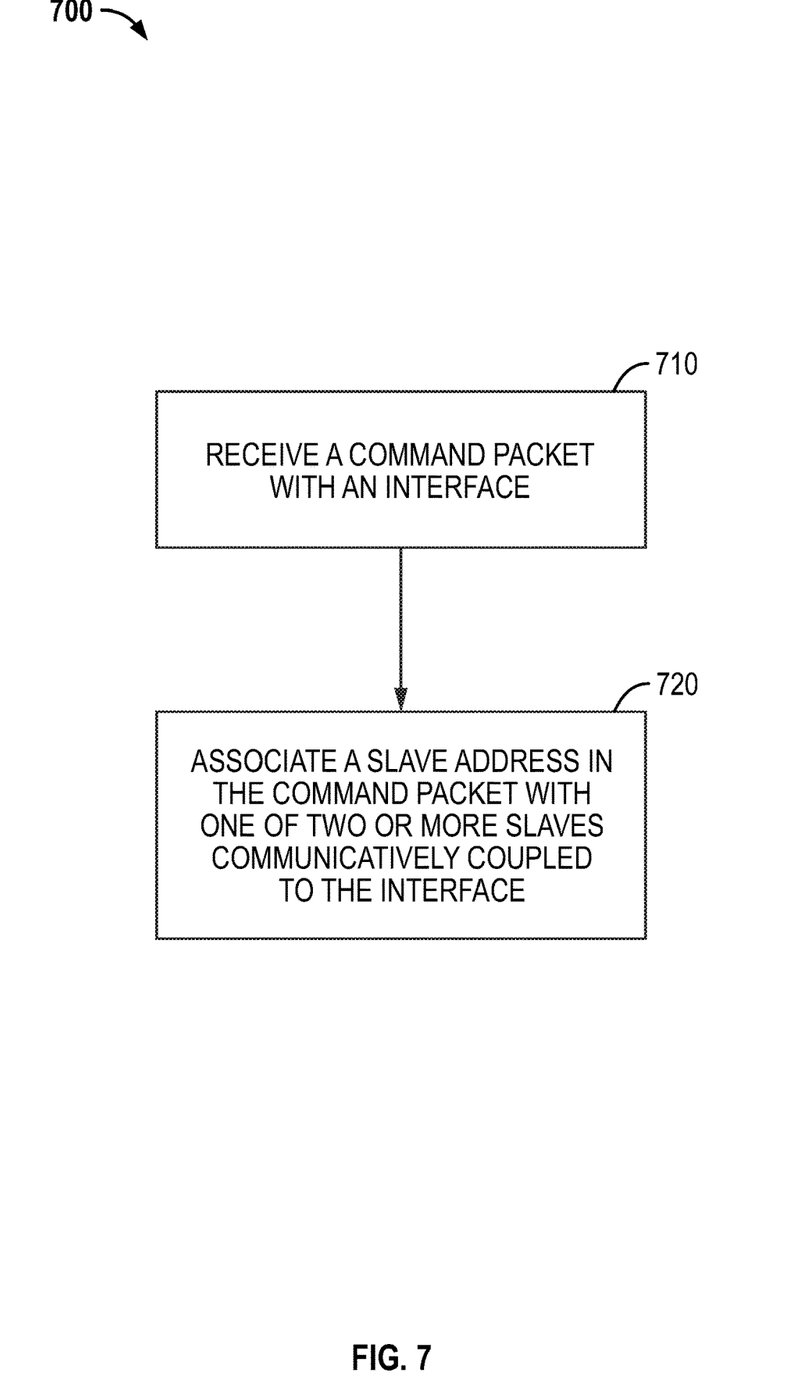
FIG. 7 shows a method 700 for communicating with two or more slaves.

FIG. 7 shows a method 700 for communicating with two or more slaves. In step 710, the method 700 receives a command packet with an interface. The command packet may be sent by a master over a master-slave bus. The interface may be the interface 100 described in the foregoing with reference to FIGS. 1-4. In an embodiment, the interface is a meter electronics for a vibratory sensor. In step 720, the method 700 associates a slave address in the command packet with one of two or more slaves communicatively coupled to the interface. In the embodiment where the interface is a meter electronics, the slave address may be associated with a meter assembly communicatively coupled to the meter electronics. That is, the meter electronics can use the slave address to identify a specific meter assembly.

In step 710, the method 700 may receive the command packet through, for example, the communication port 140 described in the foregoing. The command packet may be received from the master-slave bus 50. In step 710, the method 700 may also determine if the command packet is addressed to the interface. For example, with reference to FIG. 5, the interface 100 may determine if the first slave address 510a in the first command packet 500a matches one of the first and second address group 102a, 102b shown in FIG. 4.

In step 720, the method 700 may associate the slave address in the command packet with one of two or more slaves communicatively coupled to the interface. The method 700 may, for example, compare the slave address in the command packet with addresses stored in the interface. With reference to FIG. 4, the slave address in the command packet may be compared, at the data link layer 102, to the first and second address group 102a, 102b. The comparison may be performed by the first and second packet processes 600a, 600b described in the foregoing. As can be appreciated, the first and second packet processes 600a, 600b may perform other methods and steps, as the following discusses in more detail.

Figure 8:
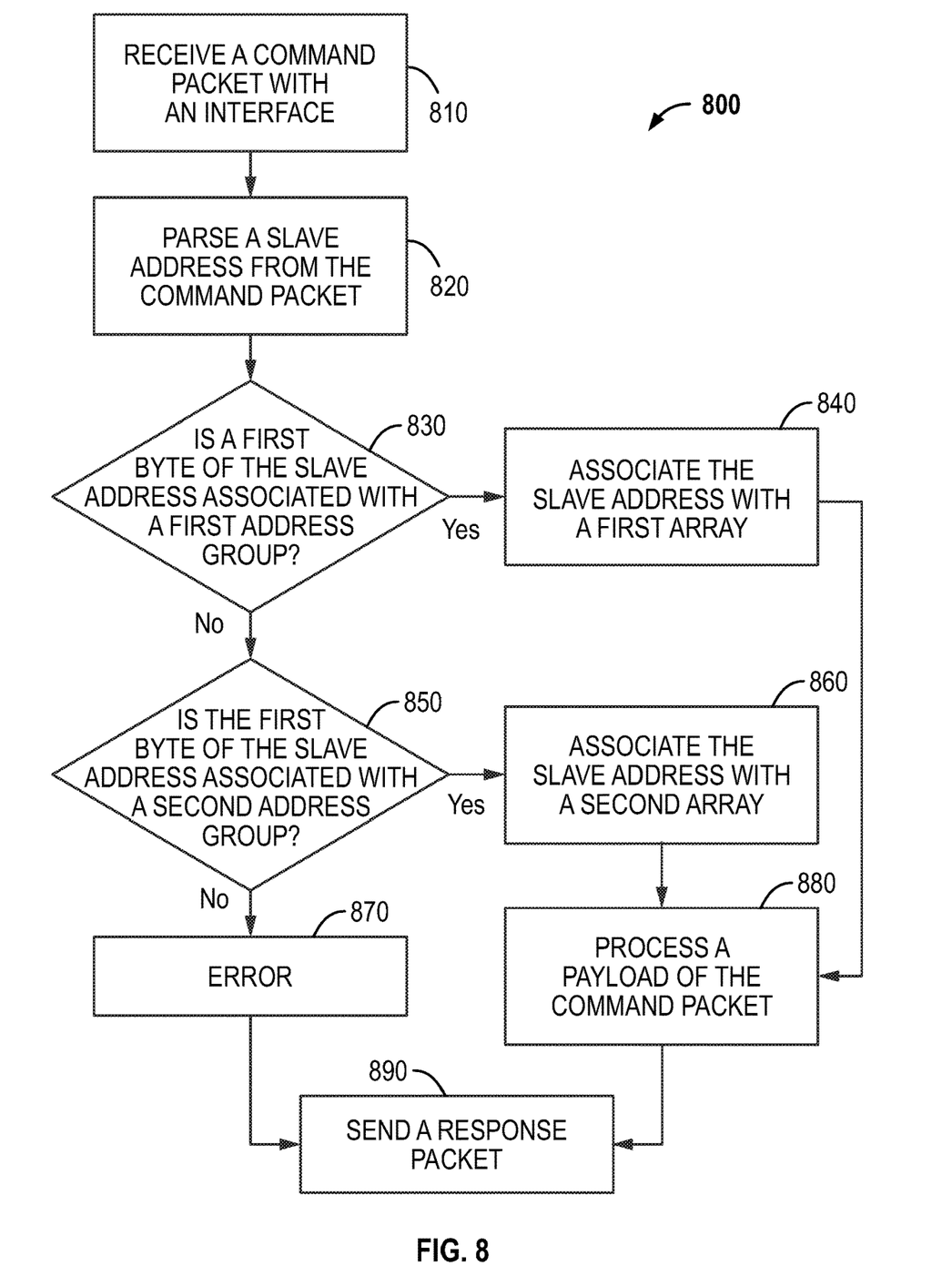
FIG. 8 shows another method 800 for communicating with two or more slaves.

FIG. 8 shows another method 800 for communicating with two or more slaves. In step 810, the method 800 receives a command packet with an interface, which may be performed in a manner similar to step 710 described in the foregoing. In step 820, the method 800 may parse a slave address from the command packet. The slave address may be in the header of the command packet. In step 830, the method 800 determines if the first byte of the slave address is associated with a first address group, such as the first address group 102a described with reference to FIG. 4. If the first byte of the slave address is associated with the first address group, then the slave address is associated with a first array in step 840, which may be the first array 104a described in the foregoing with reference to FIG. 4.

If the first byte of the slave address is not associated with the first address group, then the method 800 proceeds to step 850. In step 850, the method 800 determines if the first byte of the slave address is associated with the second address group, which may be the second address group 102b described in the foregoing with reference to FIG. 4. If the first byte of the slave address is associated with the second address group, then the method 800 proceeds to step 860, which associates the slave address with a second array. If the first byte of the slave address is not associated with the second address group, then the method proceeds to step 870, which indicates an error. After the slave address is associated with one of the first and second array in steps 840 and 860, the method 800 processes a payload of the command packet in step 880 and responds with a response packet to the master in step 890.

Steps 830 and 850 may be performed by software that includes data structure that relates the slave address to the arrays. For example, in a data table, each row may correspond to a relationship between a slave address and an array. Accordingly, in steps 830 and 850, the method 800 may lookup the first byte of the slave address in the table and select the corresponding array. Other data structures and/or methods may be employed. Based on the steps 830 and 850, the steps 840 and 860 may associate the slave address with the first or second array.

After being associated with the first or second array, a payload of the command packet may be processed to, for example, obtain data from the first or second array. With reference to the first and second array 104a, 104b described in the foregoing with reference to FIG. 4, the method 800 may execute codes, such as the first and second code 522a, 522b to read and/or write data. For example, if the slave address is associated with the first array 104a, then the first code 522a and/or data 524a may cause the interface 100 to query the first array 104a for data. Additionally or alternatively, the first code 522a and/or data 524a may cause the interface 100 to obtain data from the first slave. Accordingly, the data may be provided by the first array 104a in response to the first command packet 500a.

The embodiments described above provide for communicating with two or more slaves. As explained in the foregoing, the system 5, interface 100, and method 700, 800 can communicate with the first and second slave 10a, 10b that are communicatively coupled with the interface 100. The first and second slave 10a, 10b may provide data to the interface 100. The data may be respectively stored in a first and second array 104a, 104b, which may respectively be associated with the first and second slave 10a, 10b. The interface 100 may receive the first or second command packet 500a, 500b. The interface 100 may also parse the first and second slave address 502a, 502b from the first and second command packet 500a, 500b and respectively associate the first and second slave address 502a, 502b with the first and second slave 10a, 10b. Accordingly, data may be obtained from the first and second slave 10a, 10b through a single interface 100.

For example, in cryogenic applications, such as LNG fueling systems, the interface 100 could be a meter electronics configured for both a first meter assembly, corresponding to the first slave 10a, that is in the LNG supply line SL and a second meter assembly, corresponding to the second slave 10b, that is in the LNG return line RL. The first meter assembly may be a 1-inch vibratory sensor type associated with the first array 104a and the second meter assembly may be a ¼-inch vibratory sensor type associated with the second array 104b. The interface 100 can therefore correctly provide data to the master 40 from the first and second slave 10a, 10b to accurately measure flow rates of the LNG in both the supply line SL and the return line RL.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other systems and methods that communicate with two or more slaves and not just to the embodiments described above and shown in the accompanying figures. Accordingly, the scope of the embodiments described above should be determined from the following claims.

We claim:

1. A method of communicating with two or more slaves, the method comprising:
   receiving a command packet with an interface, wherein the command packet is sent by a master over a master-slave bus; and
   associating a slave address of the command packet with one of two or more slaves communicatively coupled to the interface;
   wherein:
      receiving the command packet with the interface comprises:
         receiving the command packet with a port communicatively coupled to the master-slave bus; and
         determining, with a processor, if the slave address corresponds to at least one of the two or more slaves; and
      associating the slave address with the one of the two or more slaves communicatively coupled to the interface comprises:
         parsing the slave address from the command packet; and
         comparing the parsed slave address with two or more address groups, wherein each of the two or of more address groups is associated with each of the two or more slaves.

2. The method of claim 1, wherein associating the slave address with the one of the two or more slaves communicatively coupled to the interface comprises associating the slave address with one of two or more arrays, wherein each of the two or more arrays is associated with each of the two or more slaves.

3. The method of claim 1, further comprising responding to the command packet by transmitting a response packet with data obtained from the one of the two or more slaves that is associated with the slave address in the command packet.

4. The method of claim 3, wherein the response packet is transmitted over the port communicatively coupled to the master-slave bus.

5. An interface for communicating with two or more slaves, the interface comprising:
   a processor configured to communicatively couple to two or more slaves; and
   a communication port communicatively coupled to the processor, the communication port being configured to communicatively couple to a master-slave bus;
   wherein the processor is configured to:
      receive a command packet from a master over the master-slave bus; and
      associate a slave address of the command packet with one of the two or more slaves;
      wherein the processor being configured to receive the command packet comprises the processor being configured to:
         receive the command packet with a communication port communicatively coupled to the master-slave bus; and
         determine if the slave address corresponds to at least one of the two or more slaves; and
      wherein the processor being configured to associate the slave address with the one of the two or more slaves communicatively coupled to the interface comprises the processor being configured to:
         parse the slave address from the command packet; and
         compare the parsed slave address with two or more address groups, wherein each of the two or of more address groups is associated with each of the two or more slaves.

6. The interface of claim 5, wherein the processor being configured to associate the slave address with the one of the two or more slaves communicatively coupled to the interface comprises the processor being configured to associate the slave address with one of two or more arrays, wherein each of the two or more arrays is associated with each of the two or more slaves.

7. The interface of claim 5, wherein the processor is further configured to respond to the command packet by transmitting a response packet with data obtained from the one of the two or more slaves that is associated with the slave address in the command packet.

8. The interface of claim 7, wherein the response packet is transmitted over the port communicatively coupled to the master-slave bus.

9. A system for communicating with two or more slaves, the system comprising:
   an interface communicatively coupled to a master over a master-slave bus; and
   two or more slaves communicatively coupled to the interface;
   wherein the interface is configured to:
      receive a command packet from the master over the master-slave bus; and
      associate a slave address of the command packet with one of the two or more slaves;
      wherein the interface being configured to receive the command packet comprises the interface being configured to:
         receive the command packet with a communication port communicatively coupled to the master-slave bus; and
         determine if the slave address corresponds to at least one of the two or more slaves; and
      wherein the interface being configured to associate the slave address with the one of the two or more slaves communicatively coupled to the interface comprises the interface being configured to:
         parse the slave address from the command packet; and
         compare the parse slave address with two or more address groups, wherein each of the two or of more address groups is associated with each of the two or more slaves.

10. The system of claim 9, wherein the interface being configured to associate the slave address with the one of the two or more slaves communicatively coupled to the interface comprises the interface being configured to associate the slave address with one of two or more arrays, wherein each of the two or more arrays is associated with each of the two or more slaves.

* * * * *